(12) United States Patent
Decker et al.

(10) Patent No.: US 10,844,877 B2
(45) Date of Patent: Nov. 24, 2020

(54) EVACUATION OF A FILM CHAMBER

(71) Applicant: Inficon GmbH, Cologne (DE)

(72) Inventors: Silvio Decker, Cologne (DE); Michael Dauenhauer, Cologne (DE); Daniel Wetzig, Cologne (DE); Hjalmar Bruhns, Bonn (DE)

(73) Assignee: INFICON GmbH, Cologne (DE)

( * ) Notice: Subject to any disclaimer, the term of this patent is extended or adjusted under 35 U.S.C. 154(b) by 283 days.

(21) Appl. No.: 15/023,087

(22) PCT Filed: Sep. 15, 2014

(86) PCT No.: PCT/EP2014/069584
§ 371 (c)(1),
(2) Date: Mar. 18, 2016

(87) PCT Pub. No.: WO2015/043993
PCT Pub. Date: Apr. 2, 2015

(65) Prior Publication Data
US 2016/0258448 A1 Sep. 8, 2016

(30) Foreign Application Priority Data
Sep. 26, 2013 (DE) .................. 10 2013 219 464

(51) Int. Cl.
| F04F 5/54 | (2006.01) |
| G01M 3/22 | (2006.01) |
| F04F 5/22 | (2006.01) |
| G01M 3/20 | (2006.01) |
| F04F 5/44 | (2006.01) |

(52) U.S. Cl.
CPC .................. *F04F 5/54* (2013.01); *F04F 5/22* (2013.01); *F04F 5/44* (2013.01); *G01M 3/205* (2013.01); *G01M 3/229* (2013.01)

(58) Field of Classification Search
CPC ...... F04F 5/54; F04F 5/44; F04F 5/22; G01M 3/229; G01M 3/205; F04B 46/06; F04B 39/06
See application file for complete search history.

(56) References Cited

U.S. PATENT DOCUMENTS

| 4,791,806 A | 12/1988 | Wade | |
| 4,984,450 A * | 1/1991 | Burger | G01M 3/202 73/40.7 |
| 5,107,697 A * | 4/1992 | Tallon | G01M 3/202 73/40.7 |
| 5,131,263 A * | 7/1992 | Handke | G01M 3/202 73/40.7 |

(Continued)

FOREIGN PATENT DOCUMENTS

| DE | 82183 | 5/1971 |
| DE | 96304 A1 | 3/1973 |

(Continued)

*Primary Examiner* — Essama Omgba
*Assistant Examiner* — Christopher J Brunjes
(74) *Attorney, Agent, or Firm* — The Webb Law Firm

(57) ABSTRACT

A device for evacuating a film chamber using a pump system that comprises at least two vacuum pumps, designed to evacuate the film chamber alternately. A suction capacity of the first vacuum pump is greater than that of the second vacuum pump and the final pressure achievable by the first vacuum pump is less than that of the second vacuum pump.

12 Claims, 2 Drawing Sheets

(56) References Cited

U.S. PATENT DOCUMENTS

| | | | | |
|---|---|---|---|---|
| 6,004,109 | A | * | 12/1999 | Gebele ............... F04B 37/14 417/205 |
| 6,354,142 | B1 | | 3/2002 | Nothhelfer et al. |
| 6,446,651 | B1 | * | 9/2002 | Abbel ............... F04D 19/046 118/715 |
| 6,945,092 | B2 | | 9/2005 | Widt |
| 6,955,076 | B1 | * | 10/2005 | Widt ............... G01M 3/227 73/40.7 |
| 7,914,265 | B2 | * | 3/2011 | Coles ............... F04B 41/06 118/715 |
| 2003/0068233 | A1 | * | 4/2003 | Royce ............... F04B 37/14 417/251 |
| 2003/0233866 | A1 | | 12/2003 | Widt |
| 2009/0208649 | A1 | * | 8/2009 | Bailey ............... C23C 16/4412 427/248.1 |
| 2011/0126936 | A1 | * | 6/2011 | Dawson ............... B01D 21/0012 141/10 |
| 2012/0255445 | A1 | * | 10/2012 | Haruna ............... F04C 28/02 96/108 |
| 2013/0259712 | A1 | * | 10/2013 | Kawasaki ............... F04B 25/00 417/201 |
| 2014/0311222 | A1 | | 10/2014 | Decker et al. |

FOREIGN PATENT DOCUMENTS

| | | | | |
|---|---|---|---|---|
| DE | 3639512 | A1 | | 6/1988 |
| DE | 102005042451 | A1 | | 3/2007 |
| DE | 102012200063 | A1 | * | 7/2013 ......... G01M 3/3281 |
| EP | 0752531 | A1 | | 1/1997 |
| JP | 6024057 | U | | 2/1985 |
| JP | 7325279 | A | | 12/1995 |
| JP | 9196797 | A | | 7/1997 |
| JP | 2001508536 | | | 6/2001 |
| WO | 0146667 | A1 | | 6/2001 |
| WO | 2013072173 | A2 | | 5/2013 |

\* cited by examiner

EVACUATION OF A FILM CHAMBER

CROSS-REFERENCE TO RELATED APPLICATIONS

This application is the United States national phase of International Application No. PCT/EP2014/069584 filed Sep. 15, 2014, and claims priority to German Application No. 10 2013 219 464.1 filed Sep. 26, 2013, the disclosures of which are hereby incorporated in their entirety by reference.

BACKGROUND OF THE INVENTION

Field of the Invention

The invention relates to a device and a method for evacuating a film chamber.

Description of Related Art

Film chambers are made of a flexible, soft material—mostly films—and are used in detecting leaks in packages. A specimen to be examined for a leak is placed in the film chamber. Most often, the specimen is a food package also made of a flexible material. The film chamber surrounding the specimen is evacuated. Thereafter, the pressure or the gas in the film chamber is monitored so as to test the tightness of the specimen and to detect a possible leak in the specimen.

Conventional film chambers are evacuated using vacuum pumps having a high suction capacity and achieving a low end pressure. Such pumps are heavy and require high electric power for operation.

Smaller, lighter pumps either have a high suction capacity or can reach a low pressure so that they are not suited as the single replacement of conventional pumps.

SUMMARY OF THE INVENTION

It is an object of the invention to provide an evacuation device, as well as a corresponding method for evacuating a film chamber so as to reach a high suction capacity and a low end pressure with smaller pumps.

A film chamber is evacuated by a pump system having at least two vacuum pumps connected in parallel and each connected with the film chamber. The two vacuum pumps are designed for an alternating evacuation of the film chamber, i.e. they are operated alternately or are alternately connected with the film chamber. As an alternative it is conceivable that the two vacuum pumps are connected with the film chamber by a common pipeline, the two vacuum pumps being alternately connected with the common pipeline by a valve or a switch element.

The suction capacity of the first vacuum pump is higher than that of the second vacuum pump, with the end pressure achievable by the second vacuum pump being lower than that of the first vacuum pump. Thus, both vacuum pumps are, each individually, lighter than the conventionally used heavy vacuum pumps. Whereas, conventionally, one large vacuum pump was used that can reach both the desired end pressure and the required suction capacity, a device according to the present invention can be based on the idea to use one vacuum pump for the desired suction capacity and one for the end pressure to be reached. These two vacuum pumps are operated alternately one after the other. Here, the vacuum pump having the higher suction capacity is used first for a rough evacuation of the film chamber. The other vacuum pump that can reach the lower end pressure is used thereafter to reach the end pressure.

In this regard it is advantageous to provide a buffer chamber between the second vacuum pump and the film chamber, the buffer chamber being evacuated by the second vacuum pump, while the first vacuum pump evacuates the film chamber. Thus, when the second vacuum pump is not connected with the film chamber, it evacuates the buffer chamber and, in doing so, preferably already reaches the end pressure desired in the film chamber. Thereafter, the film chamber is evacuated by the buffer chamber and possibly also by the second vacuum pump. Thereby, it is possible to significantly reduce the time in which the film chamber is brought to the desired end pressure.

The suction capacity of the first vacuum pump is preferably higher than the initial volume of the film chamber in liters per second (l/s, e.g. more than 1 l/s for an initial volume of 1 l) and its end pressure is higher than 50 millibars (mbar). Preferably, the suction capacity of the second vacuum pump is less than the pre-evacuated residual volume of the film chamber in l/s (e.g. less than 0.25 l/s for 250 cm$^3$) and its end pressure is less than 50 mbar. Such vacuum pumps are each sufficiently light and adapted for mobile use and, in the combination according to the invention, may still be sufficiently fast in evacuating a film chamber to the required end pressure.

The first vacuum pump may be at least one jet pump, e.g. a Venturi pump. In this regard it is conceivable that it is either exactly one jet pump or a plurality of jet pumps connected in series one behind the other.

The buffer chamber between the second port and the second vacuum pump should preferably have an evacuable volume in the range between six and eight times the volume of the film chamber volume and preferably in the range between nine and eleven tines the film chamber volume.

In a variant in which the two vacuum pumps are connected with the film chamber by a common pipeline, a valve with at least three ports may be provided in order to connect the two vacuum pumps and the pipe line or the film chamber.

The valve may preferably be a 3/2-way valve. The first port of the valve is connected with a first vacuum pump. The second port is connected with a second vacuum pump. The third port serves to connect the film chamber. The valve has at least two switching positions. In the first switching position the valve connects the first port and the third port with each other, i.e. the first vacuum pump and the film chamber. In the second switching position the valve connects the second and the third port with each other, i.e. the second vacuum pump and the film chamber. There is no switching position in which the first and the second port of the valve are connected with each other. The first vacuum pump is thus never connected with the second vacuum pump. Rather, the two vacuum pumps are alternately connected with the film chamber so as to evacuate the same one after the other.

A method for evacuating a film chamber includes evacuating the film chamber by the first vacuum pump having the higher suction capacity. For this purpose, the first vacuum pump may be connected with the film chamber and the second vacuum pump may be separated from the film chamber. Thereafter, the second vacuum pump is used to reach the low end pressure in the film chamber. To this end, the first vacuum pump may be separated from the film chamber and the second vacuum pump may be connected with the film chamber. In this regard it is advantageous if, prior to connecting the second vacuum pump with the film chamber, a buffer chamber is evacuated by the second vacuum pump. In the meantime, for example, the film chamber may already be evacuated by the first vacuum pump with the higher suction capacity.

DETAILED DESCRIPTION OF THE EMBODIMENTS

Figure 1:
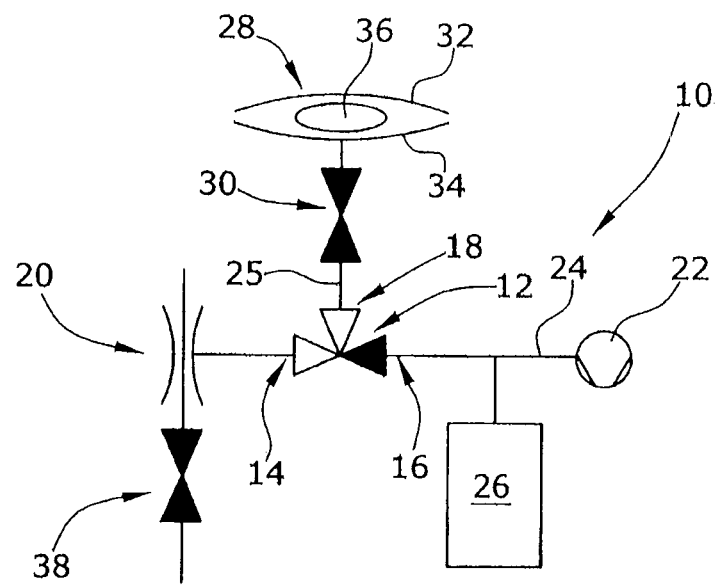
FIG. 1 is a schematic illustration of a device in a first operational state.

A central core element of a device according to the example embodiments is a 3/2-way valve 12 having three ports 14, 16, 18 and two operating paths. A first vacuum pump 20 in the form of a Venturi pump is connected with the first port 14. A second vacuum pump 22 in form of a displacement pump is connected with the second port 16. The pipeline 24 connecting the second port 16 with the second vacuum pump 22 is connected with a buffer chamber 26 in a gas-conveying manner. The third port 18 is connected with the film chamber 28 via a pipeline 25. A stop valve 30 is arranged in the pipeline 25 between the film chamber 28 and the third port 18. As an alternative, it is conceivable that each of the two vacuum pumps 20, 22 is connected with the film chamber 28 via an own separate pipeline.

The film chamber 28 includes or consists of two film layers 32, 34 between which the specimen 36 is arranged.

The Venturi pump 20 is connected with a valve 38 so as to be able to control the operation of the pump 20.

The device can be based on the idea to combine a pump having a high suction capacity, but also a high end pressure, with a pump having a low end pressure, but a low suction capacity. These two pumps 20, 22 are selectively and alternately connected with the film chamber 28 via the 3/2-way valve 12 so as to evacuate the film chamber.

At the beginning, as illustrated in FIG. 1, first, the second vacuum pump 22 is operated so as to evacuate the buffer chamber 26. The 3/2-way valve 12 is in its first switching position, in which the first port is connected with the third port. However, the first vacuum pump 20 does not yet evacuate the film chamber 28, since the stop valve 30 is blocked (shown in black). In the Figures, open valve paths are shown in white and blocked valve paths are shown in black.

As shown in FIG. 1, the second vacuum pump 22 already evacuates the buffer chamber 26 to a low pressure and possibly to the end pressure to be reached in the film chamber 28, while the film chamber 28 is still being prepared or equipped with the specimen 36.

Figure 2:
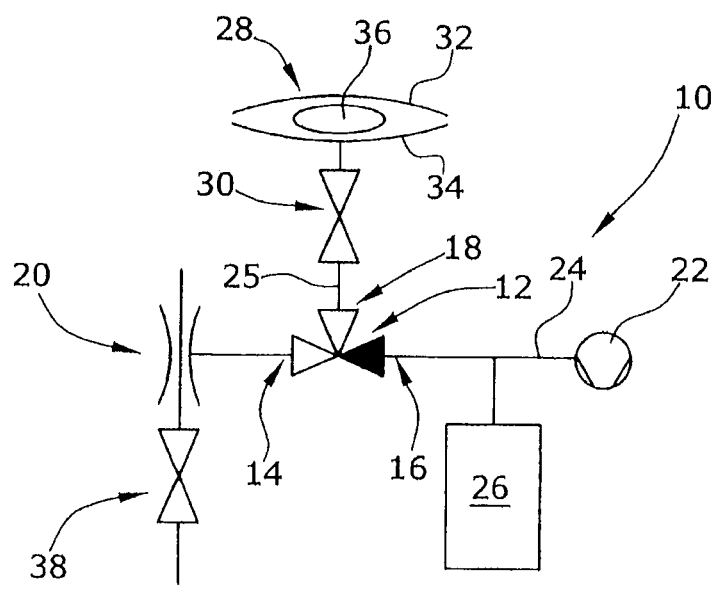
FIG. 2 shows the illustration in FIG. 1 in a second operational state.

Thereafter, as illustrated in FIG. 2, the control valve 38 for the first vacuum pump 20 is opened in order to activate the same. The 3/2-way valve 12 remains in the first switching position and the stop valve 30 is opened so that the first vacuum pump 20 now evacuates the film chamber 28 with its high suction capacity. During evacuation with the high suction capacity, the film tightly clings to the specimen 36 and the surrounding free volume inside the film chamber 28 is reduced to a few cm$^3$.

Figure 3:
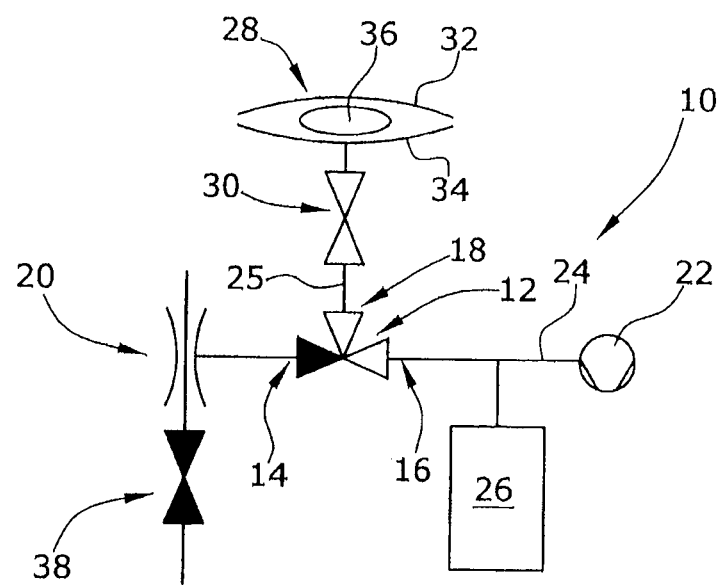
FIG. 3 shows the arrangement of FIG. 1 in a third operational state.

In order to bring the film chamber 28 to the desired end pressure to be reached, the operational state of the device of the present invention as illustrated in FIG. 3 is used. Here, the 3/2-way valve is moved to the second switching position in which the second port 16 is connected with the third port 18. The second vacuum pump 22 and the buffer chamber 26 are thus connected with the film chamber 28 in a gas-conveying manner, since the stop valve 30 stays open. The control valve 38 for the first vacuum pump 20 is closed in order to deactivate the first vacuum pump. When the 3/2-way valve is switched from the first into the second operational state, the film chamber 28 is abruptly evacuated into the buffer chamber 26. Using the second vacuum pump 22, the desired end pressure to be reached by the second vacuum pump 22 can then be reached within a short period.

While the first vacuum pump 20 (Venturi pump) can only reach an end pressure of 200 mbar, the second vacuum pump 22 can reach an end pressure of only 20 mbar. During the second operational state illustrated in FIG. 2, the first vacuum pump 20 evacuates the film chamber 28 to a free volume of 50 cm$^3$. The buffer chamber 26 has a buffer volume of 500 cm$^3$. After evacuation with the second vacuum pump 22 illustrated in FIG. 3, this results in an end pressure in the film chamber of:

$$p = (200 \text{ mbar} \cdot 50 \text{ cm}^3 + 20 \text{ mbar} \cdot 500 \text{ cm}^3)/(550 \text{ cm}^3)$$
$$= 36 \text{ mbar.}$$

The invention claimed is:

1. A device for evacuating a film chamber, the film chamber having flexible walls, the device comprising: a pump system that comprises at least two vacuum pumps comprising a first vacuum pump and a second vacuum pump configured to evacuate the film chamber alternatingly, wherein a volume flow rate of the first vacuum pump is greater than a volume flow rate of the second vacuum pump, wherein a final pressure achievable by the second vacuum pump is less than a final pressure of the first vacuum pump, wherein the film chamber is evacuated by the second vacuum pump through a pipeline which connects the film chamber to the second vacuum pump, wherein the pipeline is connected with a buffer chamber, and wherein the pump system is configured to evacuate the buffer chamber with the second vacuum pump while evacuating the film chamber with the first vacuum pump.

2. The device of claim 1, wherein each of the two vacuum pumps is connected with the film chamber via a separate pipeline.

3. The device of claim 1, wherein the two vacuum pumps are connected with the film chamber via a common pipeline.

4. The device of claim 1, wherein the pump system has a valve with at least three ports, of which
    a first port is connected with the first vacuum pump,
    a second port is connected with the second vacuum pump, and
    a third port is connected with the film chamber, wherein
    a first switching position of the valve connects the first port with the third port, and a second switching position of the valve connects the second port with the third port.

5. The device of claim 4, wherein the valve is a 3/2-way valve.

6. The device of claim 1, wherein the buffer chamber has a volume in the range of six to fifteen times the volume of the film chamber.

7. The device of claim 1, wherein a suction capacity of the first vacuum pump is higher than an initial volume of the film chamber, and the final pressure achievable by the first vacuum pump is higher than 50 mbar and less than 200 mbar.

8. The device of claim 1, wherein a suction capacity of the second vacuum pump is less than a pre-evacuated residual volume of the film chamber, and the final pressure achievable by the second vacuum pump is less than 50 mbar.

9. The device of claim 1, wherein the first vacuum pump comprises one or a plurality of jet pumps.

10. The device of claim 1, wherein at least one of the two vacuum pumps comprises a pipeline connecting the pump with the film chamber and comprising a stop valve.

11. A method for evacuating a film chamber, the film chamber having flexible walls, the method comprising:

alternatingly evacuating the film chamber by a first vacuum pump and a second vacuum pump, wherein a volume flow rate of the first vacuum pump is greater than a volume flow rate of the second vacuum pump, wherein a final pressure achievable by the second vacuum pump is less than a final pressure of the first vacuum pump, and wherein the film chamber is evacuated by the second vacuum pump through a pipeline which connects the film chamber to the second vacuum pump, wherein the pipeline is connected with a buffer chamber; and prior to the evacuation of the film chamber by the second vacuum pump, evacuating by the second vacuum pump the buffer chamber while evacuating the film chamber by the first vacuum pump.

12. The method of claim 11, wherein a first port of a valve is connected with the first vacuum pump, wherein a second port of the valve is connected with the second vacuum pump, and wherein a third port of the valve is connected with the film chamber, wherein a first switching position of the valve connects the first port with the third port, and wherein a second switching position of the valve connects the second port with the third port, the method further comprising: prior to the evacuation of the film chamber by the first vacuum pump, switching the valve to the first switching position, wherein the valve is switched to the second switching position prior to the evacuation of the film chamber by the second vacuum pump.

* * * * *